(12) United States Patent
Kwak

(10) Patent No.: US 12,199,232 B2
(45) Date of Patent: Jan. 14, 2025

(54) METHOD OF MANUFACTURING POUCH-SHAPED BATTERY CELL USING PROTECTIVE FILM AND POUCH-SHAPED BATTERY CELL MANUFACTURED USING THE SAME

(71) Applicant: LG Energy Solution, Ltd., Seoul (KR)

(72) Inventor: Jin Seop Kwak, Daejeon (KR)

(73) Assignee: LG Energy Solution, Ltd., Seoul (KR)

(\*) Notice: Subject to any disclaimer, the term of this patent is extended or adjusted under 35 U.S.C. 154(b) by 205 days.

(21) Appl. No.: 17/770,383

(22) PCT Filed: Oct. 29, 2020

(86) PCT No.: PCT/KR2020/014971
§ 371 (c)(1),
(2) Date: Apr. 20, 2022

(87) PCT Pub. No.: WO2021/118057
PCT Pub. Date: Jun. 17, 2021

(65) Prior Publication Data
US 2022/0376288 A1 Nov. 24, 2022

(30) Foreign Application Priority Data
Dec. 9, 2019 (KR) ........................ 10-2019-0162521

(51) Int. Cl.
*H01M 10/04* (2006.01)
*H01M 4/04* (2006.01)
(Continued)

(52) U.S. Cl.
CPC ....... *H01M 10/049* (2013.01); *H01M 50/105* (2021.01); *H01M 50/186* (2021.01);
(Continued)

(58) Field of Classification Search
CPC ............. H01M 10/049; H01M 50/186; H01M 50/105; H01M 50/211; H01M 50/178; H01M 50/553; H01M 4/0447
See application file for complete search history.

(56) References Cited

U.S. PATENT DOCUMENTS 6,743,546 B1   6/2004  Kaneda et al.
9,300,003 B2*  3/2016  Park ................... H01M 10/0404
(Continued)

FOREIGN PATENT DOCUMENTS

CN         1316114 A      10/2001
CN       104300095 A       1/2015
(Continued)

OTHER PUBLICATIONS

International Search Report for Application No. PCT/KR2020/014971 mailed Feb. 8, 2021, 2 pages.

*Primary Examiner* — Matthew J Merkling
(74) *Attorney, Agent, or Firm* — Lerner David LLP

(57) ABSTRACT

Disclosed is a method of manufacturing a pouch-shaped battery cell, the method including (a) receiving an electrode assembly in a preliminary battery case and sealing other outer peripheries of the preliminary battery case excluding a first side outer periphery of the preliminary battery case, through which gas is discharged, (b) attaching a protective film to at least one corner portion of an electrode assembly receiving portion, (c) performing an activation process and a degassing process, (d) resealing a first side outer periphery of the electrode assembly receiving portion, and (e) removing the protective film, wherein the inner surface of the protective film is attached to the outer surface of the corner portion of the electrode assembly receiving portion in tight contact therewith without being crumpled in order to support the shape of the corner portion of the electrode assembly receiving portion, which is technology capable of preventing (Continued)

the preliminary battery case from being deformed by force continuously applied to the preliminary battery case in a process of manufacturing the pouch-shaped battery cell.

13 Claims, 7 Drawing Sheets

(51) Int. Cl.
*H01M 50/105* (2021.01)
*H01M 50/186* (2021.01)
*H01M 50/30* (2021.01)
*H01M 50/609* (2021.01)

(52) U.S. Cl.
CPC ......... *H01M 50/30* (2021.01); *H01M 50/609* (2021.01); *H01M 4/0447* (2013.01)

(56) References Cited

U.S. PATENT DOCUMENTS

| | | | |
|---|---|---|---|
| 9,882,233 B2* | 1/2018 | Kim | H01M 10/049 |
| 2013/0244095 A1* | 9/2013 | Min | H01M 50/103 |
| | | | 429/185 |
| 2014/0011070 A1* | 1/2014 | Kim | H01M 50/124 |
| | | | 29/623.2 |
| 2014/0087231 A1* | 3/2014 | Schaefer | H01M 10/6554 |
| | | | 429/120 |
| 2015/0024263 A1 | 1/2015 | Han | |
| 2016/0181667 A1 | 6/2016 | Kim et al. | |
| 2017/0166373 A1 | 6/2017 | Ogawa et al. | |
| 2018/0041023 A1 | 2/2018 | Farfan et al. | |
| 2019/0131666 A1* | 5/2019 | Lee | H01M 10/4214 |
| 2020/0067034 A1 | 2/2020 | Kim et al. | |
| 2020/0185675 A1 | 6/2020 | Lee et al. | |
| 2020/0235360 A1 | 7/2020 | Lim et al. | |

FOREIGN PATENT DOCUMENTS

| | | |
|---|---|---|
| CN | 107949932 A | 4/2018 |
| JP | 2004055171 A | 2/2004 |
| KR | 20080019313 A | 3/2008 |
| KR | 20130092800 A | 8/2013 |
| KR | 20130113301 A | 10/2013 |
| KR | 20140131714 A | 11/2014 |
| KR | 20150010481 A | 1/2015 |
| KR | 20170132565 A | 12/2017 |
| KR | 20180059373 A | 6/2018 |
| KR | 20180107461 A | 10/2018 |
| KR | 20190042797 A | 4/2019 |
| KR | 20190042800 A | 4/2019 |
| KR | 20190042801 A | 4/2019 |
| KR | 20190054810 A | 5/2019 |

* cited by examiner

[FIG. 1]
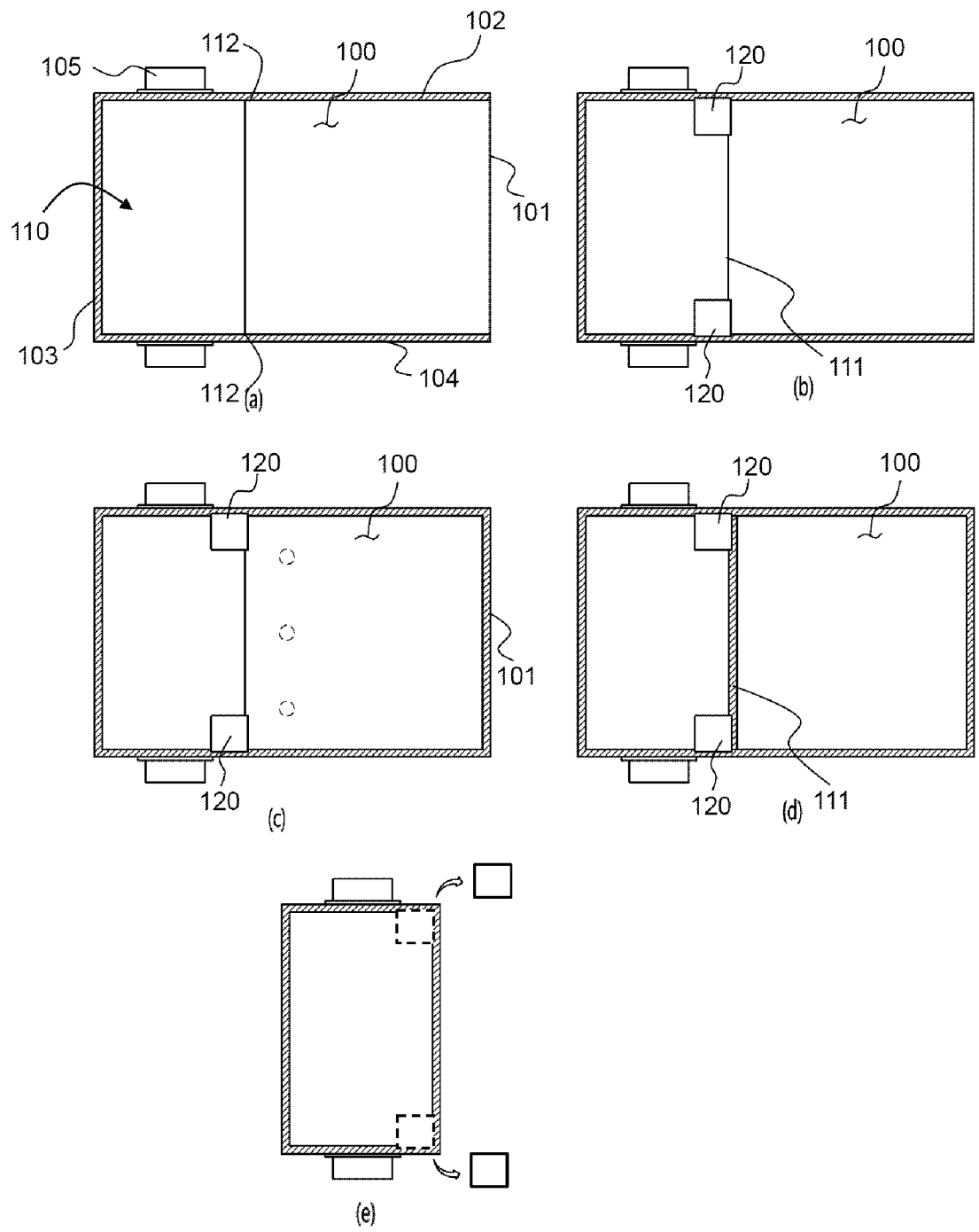

[FIG. 2]
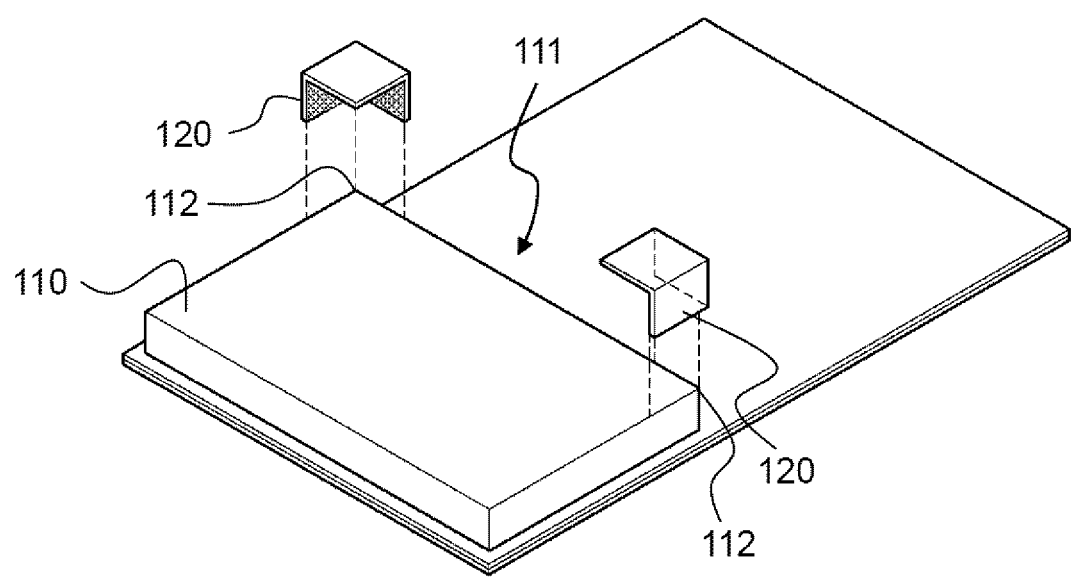

[FIG. 3]
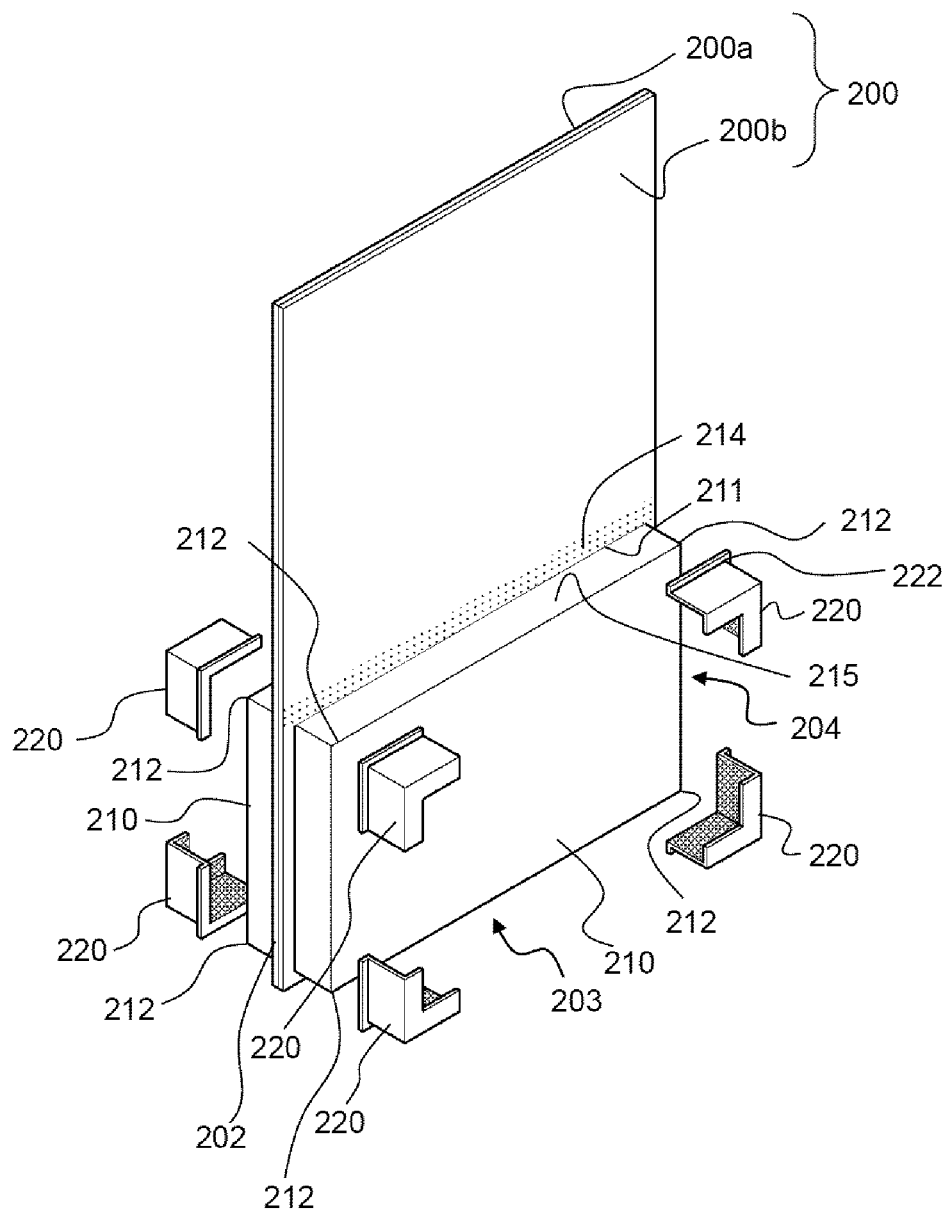

[FIG. 4]
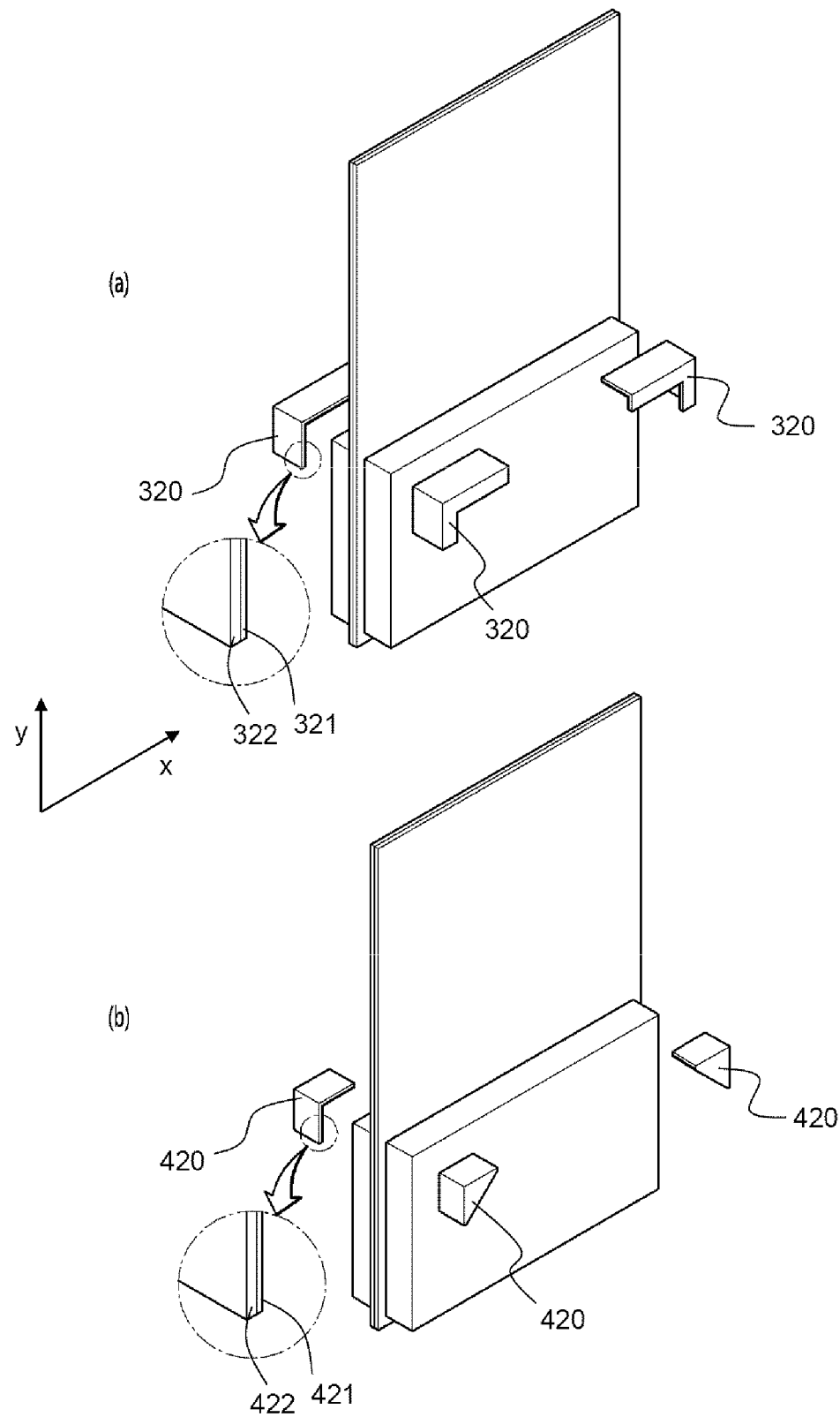

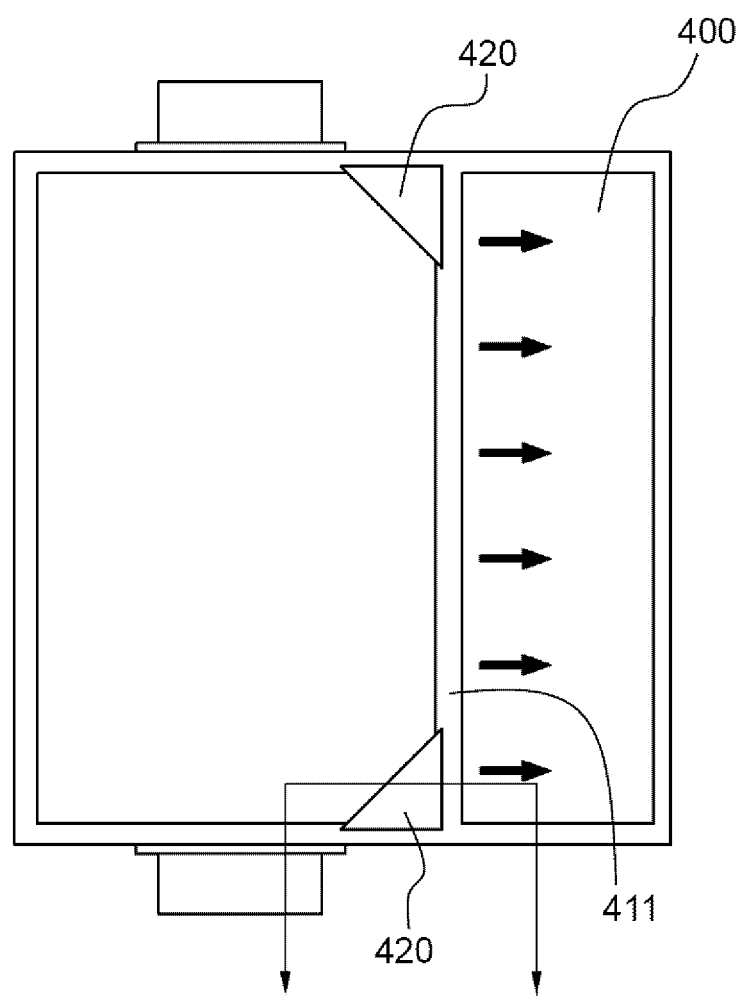
[FIG. 5]

[FIG. 6]
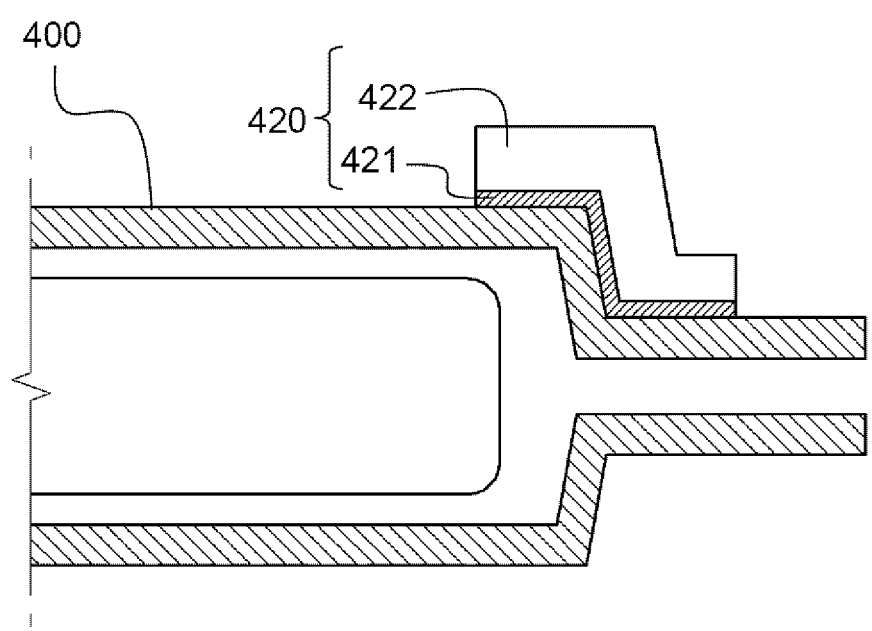

[FIG. 7]
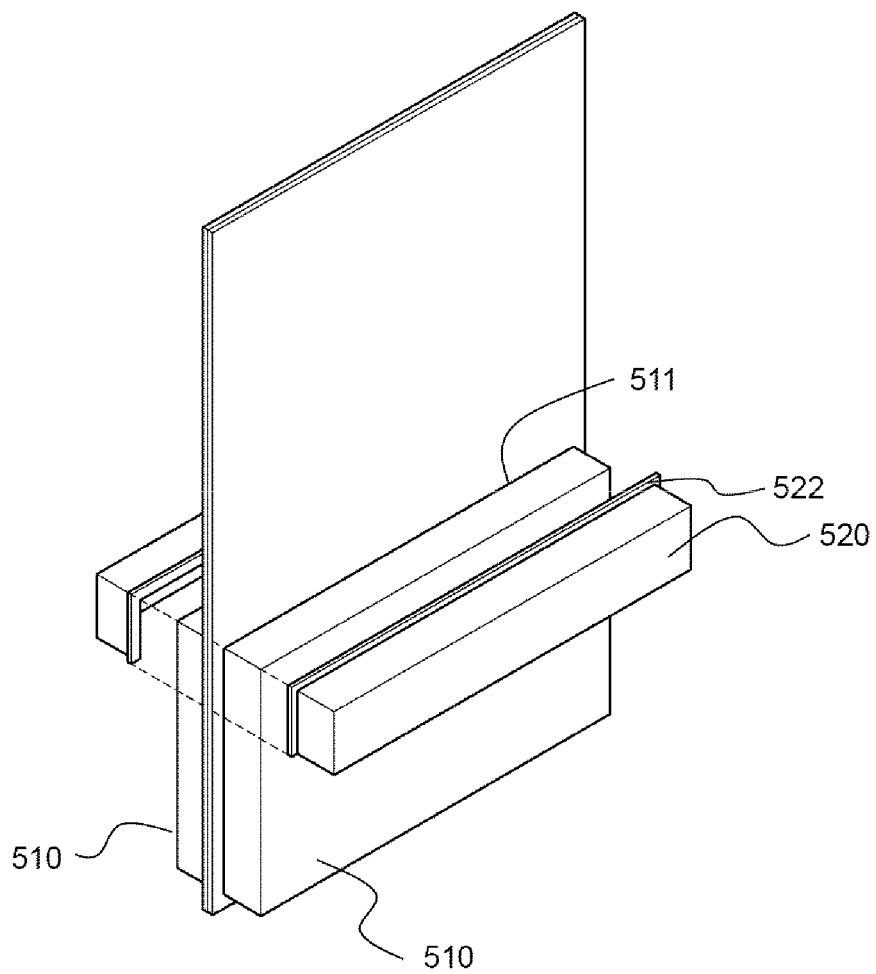

METHOD OF MANUFACTURING POUCH-SHAPED BATTERY CELL USING PROTECTIVE FILM AND POUCH-SHAPED BATTERY CELL MANUFACTURED USING THE SAME

CROSS-REFERENCE TO RELATED APPLICATIONS

This application is a national stage entry under 35 U.S.C. § 371 of International Application No. PCT/KR2020/014971, filed on Oct. 29, 2020, published in Korean, which claims priority to Korean Patent Application No. 10-2019-0162521, filed on Dec. 9, 2019, the disclosures of which are hereby incorporated by reference herein their entireties.

TECHNICAL FIELD

The present invention relates to a method of manufacturing a pouch-shaped battery cell using a protective film and a pouch-shaped battery cell manufactured using the same, and more particularly to a method of manufacturing a pouch-shaped battery cell using a protective film capable of manufacturing the pouch-shaped battery cell in the state in which the protective film is attached to the portion of the pouch-shaped battery cell that may be the most greatly deformed in a process of manufacturing the pouch-shaped battery cell, whereby it is possible to remarkably reduce a battery cell defect rate, and a pouch-shaped battery cell manufactured using the same.

BACKGROUND ART

Based on the shape of a case, a lithium secondary battery is classified as a cylindrical battery, a prismatic battery, or a pouch-shaped battery. Each of the cylindrical battery and the prismatic battery is a battery having an electrode assembly mounted in a metal can, and the pouch-shaped battery is a battery having an electrode assembly mounted in a pouch-shaped case generally made of an aluminum laminate sheet. Among these batteries, the pouch-shaped battery, which can be stacked with high integration, has high energy density per unit weight, is inexpensive, and can be easily modified, has attracted considerable attention in recent years.

The laminate sheet includes an outer coating layer configured to secure insulation thereof and to protect the surface thereof, a metal layer configured to block gas and moisture and to allow a battery case to be easily formed, and an inner resin layer for adhesion.

In general, a process of forming an electrode assembly receiving portion, a degassing process, and a process of sealing the outer periphery of the battery case are performed in order to manufacture the pouch-shaped battery. While the above processes are performed, the metal layer of the laminate sheet may be damaged. In particular, stress is concentrated on corner portions of the electrode assembly receiving portion, in which the electrode assembly is received. As a result, there is a high possibility of cracks being formed at the corner portions of the electrode assembly receiving portion.

In the case in which cracks are formed at the laminate sheet, as described above, an electrolytic solution may leak out of the battery, or external moisture may be introduced into the battery. Leakage of the electrolytic solution may induce ignition due to high-voltage ground fault current, whereby safety of the battery may be reduced.

In connection therewith, Patent Document 1 discloses a crumple prevention portion formed at a sealing block used in a process of manufacturing a pouch-shaped secondary battery. In Patent Document 1, the sealing block, at which the crumple prevention portion is formed, is used to form sealing portions at outer peripheral corner portions of an electrode assembly receiving portion. It is possible to prevent crumples from being formed at the corner portions of the electrode assembly receiving portion by the provision of the sealing portions.

Patent Document 2 discloses a pouch-shaped battery case configured such that, among outer peripheral sealing portions of a concave portion configured to receive an electrode assembly, a non-sealing portion is formed at the outer periphery through which an electrolytic solution is infused and gas is discharged, wherein ends of the outer periphery through which gas is discharged, excluding a central portion thereof, are sealed in advance.

In Patent Document 1 and Patent Document 2, the sealing portions are formed in advance as structures for preventing crumples from being formed at the corner portions or the ends of the outer peripheries in the early stage of manufacture of the battery case. However, it is difficult to prevent the corner portions from being deformed by stress repeatedly concentrated thereon in subsequent degassing and resealing processes.

Therefore, there is a high necessity for technology capable of preventing corner portions of an electrode assembly receiving portion from being deformed or cracked by force continuously applied to the corner portions while a process of manufacturing a pouch-shaped battery cell is performed.

Prior Art Documents (Patent Document 1) Korean Patent Application Publication No. 2019-0042801 (2019 Apr. 25)
(Patent Document 2) Korean Patent Application Publication No. 2019-0042800 (2019 Apr. 25)

DISCLOSURE

Technical Problem

The present invention has been made in view of the above problems, and it is an object of the present invention to provide a method of manufacturing a pouch-shaped battery cell using a protective film capable of preventing deformation of corner portions of an electrode assembly receiving portion and maintaining the initial shape of the corner portions in a process of manufacturing the pouch-shaped battery cell and a pouch-shaped battery cell manufactured using the same.

Technical Solution

In order to accomplish the above object, a method of manufacturing a pouch-shaped battery cell according to the present invention includes (a) receiving an electrode assembly in a preliminary battery case and sealing other outer peripheries of the preliminary battery case excluding a first side outer periphery of the preliminary battery case, through which gas is discharged, (b) attaching a protective film to at least one corner portion of an electrode assembly receiving portion, (c) performing an activation process and a degassing process, (d) resealing a first side outer periphery of the electrode assembly receiving portion, and (e) removing the protective film, wherein the inner surface of the protective film is attached to the outer surface of the corner portion of the electrode assembly receiving portion in tight contact therewith without being crumpled in order to support the shape of the corner portion of the electrode assembly receiving portion.

The corner portion may be a portion at which the bottom surface of the electrode assembly receiving portion and two adjacent side surfaces of the electrode assembly receiving portion are joined to each other, and the protective film may be attached to each of opposite end corner portions of the first side outer periphery of the electrode assembly receiving portion.

The corner portion may be a portion at which the bottom surface of the electrode assembly receiving portion and two adjacent side surfaces of the electrode assembly receiving portion are joined to each other, and the protective film may be attached to each of all corner portions of the bottom surface of the electrode assembly receiving portion.

The protective film may be attached so as to extend to a resealing prearrangement portion of step (d).

The protective film may be formed so as to have a size and a shape corresponding respectively to the size and the shape of the corner portion of the electrode assembly receiving portion.

The protective film may be formed so as to have a size and a shape corresponding respectively to the sizes and the shapes of the corner portion of the electrode assembly receiving portion and the resealing prearrangement portion extending from the corner portion.

The protective film may be constituted by an adhesive layer including an adhesive material and a film layer including nylon or a PET-based compound.

The adhesive layer of the protective film may be attached to the outer surface of the corner portion of the electrode assembly receiving portion in order to maintain the shape of the corner portion of the electrode assembly receiving portion in step (c) and step (d).

The protective film may be attached along the first side outer periphery of the electrode assembly receiving portion comprising opposite end corner portions of the first side outer periphery.

The method may include a process of temporarily sealing the first side outer periphery of the preliminary battery case before the activation process of step (c) is performed.

The method may include removing an end of the first side outer periphery of the preliminary battery case and folding the first side outer periphery and the third side outer periphery between step (d) and step (e).

The present invention provides a pouch-shaped battery cell manufactured using the method of manufacturing the pouch-shaped battery cell and a battery module including the pouch-shaped battery cell.

DESCRIPTION OF DRAWINGS

FIG. 1 is a view showing a process of manufacturing a pouch-shaped battery cell according to the present invention.

FIG. 2 is a perspective view of a preliminary battery case to which a protective film according to a first embodiment is attached.

FIG. 3 is a perspective view of a preliminary battery case to which a protective film according to a second embodiment is attached.

FIG. 4 is a perspective view of a preliminary battery case to which a protective film according to each of a third embodiment and a fourth embodiment is attached.

FIG. 5 is a plan view of FIG. 4(b).

FIG. 6 is a partial sectional view of FIG. 4.

FIG. 7 is a perspective view of a preliminary battery case to which a protective film according to a fifth embodiment is attached.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A description to embody elements through limitation or addition may be applied to all inventions, unless particularly restricted, and does not limit a specific invention.

Hereinafter, embodiments of the present invention will be described in detail with reference to the accompanying drawings.

FIG. 1 is a view showing a process of manufacturing a pouch-shaped battery cell according to the present invention.

Referring to FIG. 1, the method of manufacturing the pouch-shaped battery cell according to the present invention includes a step of receiving an electrode assembly 105 in an electrode assembly receiving portion 110 formed in a preliminary battery case 100 and sealing a second side outer periphery 102, a third side outer periphery 103, and a fourth side outer periphery 104 of the preliminary battery case excluding a first side outer periphery 101 of the preliminary battery case, through which gas is discharged, a step of attaching a protective film 120 to at least one corner portion of the electrode assembly receiving portion, a step of performing an activation process and a degassing process, a step of resealing a first side outer periphery 111 of the electrode assembly receiving portion 110, and a step of removing the protective film 120.

A process of temporarily sealing the first side outer periphery 101 of the preliminary battery case may be further included before the activation process is performed.

In addition, a step of removing an end of the first side outer periphery 101 of the preliminary battery case and folding the first side outer periphery 101 and the third side outer periphery 103 may be further included after the resealing step and before the step of removing the protective film.

That is, the protective film is maintained attached to the corner portion until the first side outer periphery and the third side outer periphery are folded after the other outer peripheries of the preliminary battery case excluding the first side outer periphery are sealed. After the first side outer periphery and the third side outer periphery are folded, the protective film is removed from the corner portion of the electrode assembly receiving portion, whereby the pouch-shaped battery cell is manufactured.

Alternatively, after the end of the first side outer periphery of the preliminary battery case is removed, the protective film may be removed in the state in which the step of folding the first side outer periphery 101 and the third side outer periphery 103 is omitted.

The first side outer periphery and the third side outer periphery mean outer peripheries oriented in directions in which no electrode terminals protrude.

The corner portion is a portion at which the bottom surface of the electrode assembly receiving portion and two adjacent side surfaces of the electrode assembly receiving portion are joined to each other. The corner portion mentioned in this specification refers to the same portion as the above mentioned portion.

The inner surface of the protective film 120 is attached to the outer surface of the corner portion of the electrode assembly receiving portion in tight contact therewith without being crumpled in order to support the shape of the corner portion of the electrode assembly receiving portion. Even in the case in which external force is applied to the preliminary battery case to the extent to which the preliminary battery case is crumpled or deformed in a process of manufacturing the pouch-shaped battery cell, therefore, the shape of the corner portion may be maintained.

FIG. 2 is a perspective view of a preliminary battery case to which a protective film according to a first embodiment is attached.

Referring to FIG. 2, protective films 120 are attached to opposite end corner portions 112 of a first side outer periphery 111 of an electrode assembly receiving portion 110.

Each of the protective films 120 has a three-dimensional cubic shape, and is formed so as to have a size and shape corresponding respectively to the size and shape of a corresponding one of the corner portions 112 of the electrode assembly receiving portion. The inner surface of the protective film 120 and the outer surface of the corner portion are completely attached to each other in tight contact with each other without being crumpled.

Even in the case in which external force is applied to the preliminary battery case to the extent to which the preliminary battery case is contracted or twisted in a process of manufacturing a pouch-shaped battery cell, therefore, the inner surface of the protective film is maintained attached to the corner portion in tight contact therewith. Consequently, it is possible to prevent the corner portion from being crumpled or cracked.

FIG. 3 is a perspective view of a preliminary battery case to which a protective film according to a second embodiment is attached.

Referring to FIG. 3, the preliminary battery case 200 includes a first case 200a and a second case 200b, outer peripheries of which are sealed by thermal fusion, and each of the first case 200a and the second case 200b has an electrode assembly receiving portion 210 formed therein.

Also, in a degassing process, which is included in a process of manufacturing a pouch-shaped battery cell, a method of decompressing the preliminary battery case into a vacuum state may be used. At this time, the preliminary battery case may be deformed while being contracted. Such deformation may occur the most greatly at a first side outer periphery 211 of the electrode assembly receiving portion, which is oriented in a direction in which gas is discharged. However, the other outer peripheries are deformed although there is a difference in degree.

In particular, a third side outer periphery 203 may be deformed more than a second side outer periphery 202 and a fourth side outer periphery 204, since the third side outer periphery is an outer periphery in a major-axis direction of an electrode assembly.

Therefore, FIG. 3 shows the state in which protective films are further disposed at opposite end corner portions 212 of the third side outer periphery 203 of the electrode assembly receiving portion, which is opposite the first side outer periphery 211 of the electrode assembly receiving portion, i.e. the protective films 220 are attached to all corner portions of the bottom surface of the electrode assembly receiving portion. In the case in which the protective films 220 are attached to all of the corner portions 212, as described above, it is possible to prevent deformation of the second side outer periphery to the fourth side outer periphery as well as the first side outer periphery.

The protective film 220 shown in FIG. 3 is different from the protective film 120 of FIG. 2 in that the planar shape of the portion of the protective film that is added to the bottom surface of the electrode assembly receiving portion is not a quadrangular shape but is a "¬" shape.

In addition, the protective film 220 further includes an extension portion 222 not only configured to wrap the corner portion 212 but also extending to a resealing prearrangement portion 214, whereby the protective film is formed so as to have a size and shape corresponding respectively to the sizes and shapes of the corner portion and the resealing prearrangement portion extending from the corner portion. In the case in which the protective film 220 is attached, therefore, it is possible to additionally prevent deformation of a connection portion between a side wall 215 of the electrode assembly receiving portion and the resealing prearrangement portion 214.

FIG. 4 is a perspective view of a preliminary battery case to which a protective film according to each of a third embodiment and a fourth embodiment is attached.

Referring to FIG. 4, the protective film 320 shown in FIG. 4(a) is configured such that the portion of the protective film oriented in an x-axis direction, which is a major-axis direction of an electrode assembly receiving portion, is longer than the portion of the protective film oriented in a y-axis direction, which is a minor-axis direction of the electrode assembly receiving portion, compared to the protective film 220 of FIG. 3.

In consideration of the fact that the major-axis direction outer periphery of the electrode assembly receiving portion is deformed more than the minor-axis direction outer periphery of the electrode assembly receiving portion, the length of the protective film attached to the portion of the preliminary battery case that is further deformed is increased, whereby it is possible to improve the effect of preventing deformation of the preliminary battery case.

The protective film 420 shown in FIG. 4(b) is configured such that the planar shape of the portion of the protective film that wraps the bottom surface of an electrode assembly receiving portion is a triangular shape. In consideration of the fact that deformation of a corner portion of the electrode assembly receiving portion generally occurs at a side wall of the electrode assembly receiving portion, it is possible to achieve a desired effect even in the case in which a structure like the protective film 420 is used.

The protective film 320 has a dual-layer structure including an adhesive layer 321 constituting the inner surface thereof and a film layer 322 constituting the outer surface thereof, and the protective film 420 has a dual-layer structure including an adhesive layer 421 constituting the inner surface thereof and a film layer 422 constituting the outer surface thereof.

In a concrete example, the thickness of the adhesive layer may be 5 μm to 30 μm, specifically 5 μm to 20 μm, more specifically 10 μm. The thickness of the film layer may be 50 μm to 150 μm, specifically 50 μm to 100 μm, more specifically 50 μm to 70 μm.

The overall elongation of the protective film may be within 10%. In the case in which the elongation of the protective film is greater than 10%, the preliminary battery case deformed in degassing and resealing processes may be lengthened while the shape of the preliminary battery case may not be fixed, which is undesirable. In the case in which the elongation of the protective film is too small, internal stress of the preliminary battery case against deformation of the preliminary battery case may be increased, whereby the preliminary battery case may be fractured or cracked, which is also undesirable.

Each of the protective films 320 and 420 shown in FIG. 4 includes no extension portion extending to an outer peripheral sealing portion of the electrode assembly receiving portion. Of course, however, an extension portion may be included, unlike what is shown.

FIG. 5 is a plan view of FIG. 4(b), and FIG. 6 is a partial sectional view of FIG. 4.

Referring to FIGS. 5 and 6, the preliminary battery case 400 is configured such that gas is discharged in a direction indicated by arrows and the protective films 420 are attached to opposite end corner portions of a first side outer periphery 411 of the electrode assembly receiving portion oriented in the direction in which the gas is discharged.

The protective film 420 is configured to have a structure in which an adhesive layer 421 including an adhesive material is located as the inner surface thereof and a film layer 422 including nylon or a PET-based compound is located at the outer surface of the adhesive layer 421. That is, the shape of the corner portion may be supported and maintained by the film layer, and the protective film may be stably attached and fixed to the outer surface of the corner portion by the adhesive layer.

A method of adding the adhesive layer to the inner surface of the film layer is not particularly restricted. For example, an adhesive may be applied to the inner surface of the film layer, or an adhesive material may be sprayed onto the inner surface of the film layer.

FIG. 7 is a perspective view of a preliminary battery case to which a protective film according to a fifth embodiment is attached.

Referring to FIG. 7, the protective film 520 is formed so as to extend long along a first side outer periphery 511 of an electrode assembly receiving portion 510 including opposite end corner portions of the first side outer periphery 511 of the electrode assembly receiving portion.

Consequently, it is possible to improve the effect of preventing deformation of the first side outer periphery, which is greatly deformed in a process of manufacturing a pouch-shaped battery cell.

The protective film 520 shown in FIG. 7 includes an extension portion 522 extending to a sealing prearrangement portion so as to wrap the corner portions. Of course, however, the protective film may include no extending portion.

The method of manufacturing the pouch-shaped battery cell according to the present invention includes a process of removing the protective film from the battery case. It is preferable that the adhesive layer attached to the inner surface of the film layer of the protective film be removed from the outer surface of the battery case together with the film layer.

In the method of manufacturing the pouch-shaped battery cell according to the present invention and the pouch-shaped battery cell manufactured using the same, as described above, it is possible to prevent cracks from being formed at the corner portion of the electrode assembly receiving portion in the manufacturing process, whereby it is possible to reduce a battery cell defect rate and at the same time to prevent a possibility of ignition due to infusion of an electrolytic solution.

Those skilled in the art to which the present invention pertains will appreciate that various applications and modifications are possible within the category of the present invention based on the above description.

DESCRIPTION OF REFERENCE SYMBOLS 100, 200, 400: Preliminary battery cases
101: First side outer periphery of preliminary battery case
102, 202: Second side outer peripheries
103, 203: Third side outer peripheries
104, 204: Fourth side outer peripheries
105: Electrode assembly
110, 210, 510: Electrode assembly receiving portions
111, 211, 411, 511: First side outer peripheries of electrode assembly receiving portions
112, 212: Corner portions
120, 220, 320, 420, 520: Protective films
200a: First case
200b: Second case
214: Resealing prearrangement portion
215: Side wall of electrode assembly receiving portion
222, 522: Extension portions
321, 421: Adhesive layers
322, 422: Film layers

INDUSTRIAL APPLICABILITY

As is apparent from the above description, in the present invention, a pouch-shaped battery cell is manufactured in the state in which a corner portion of an electrode assembly receiving portion is in tight contact with the inner surface of a protective film. Consequently, the shape of the corner portion to which the protective film is attached may be maintained in a process of infusing an electrolytic solution, a process of discharging gas, a process of resealing an outer periphery of a preliminary battery case, and a process of removing an end of the outer periphery of a preliminary battery case.

Also, in the case in which an adhesive layer is provided at the inner surface of the protective film, the outer surface of the corner portion may be brought into tight contact with the protective film via the adhesive layer.

Since the shape of the corner portion is supported by the protective film such that the shape of the electrode assembly receiving portion formed in the preliminary battery case is maintained, as described above, it is possible to prevent the preliminary battery case from being crumpled or cracked in a process of manufacturing the pouch-shaped battery cell.

Consequently, it is possible to reduce a pouch-shaped battery cell defect rate and to reduce a danger of ignition due to ground fault current, which may be induced by leakage of the electrolytic solution.

The invention claimed is:

1. A method of manufacturing a pouch-shaped battery cell, the method comprising:
    (a) placing an electrode assembly in a preliminary battery case and sealing outer peripheries of the preliminary battery case excluding a first side outer periphery of the preliminary battery case, the first side outer periphery being configured to receive a discharge of gas therethrough;
    (b) attaching at least one protective film to at least one corner portion of an electrode assembly receiving portion of the preliminary battery case, each protective film having an adhesive layer comprising an adhesive material and a film layer;
    (c) performing an activation process and a degassing process on the electrode assembly;
    (d) sealing the first side outer periphery of the preliminary battery case; and
    (e) removing the at least one protective film,
    wherein an inner surface of each protective film is attached to an outer surface of a corresponding one of the at least one corner portion of the electrode assembly receiving portion in tight contact therewith without being crumpled, each protective film supporting a shape of the corresponding one of the at least one corner portion during the performing of the activation process and the degassing process.

2. The method according to claim 1, wherein
    each corner portion is a portion at which a bottom surface of the electrode assembly receiving portion and two adjacent side surfaces of the electrode assembly receiving portion are joined to each other, and
    each of first and second ones of the at least one corner portion are opposite end corner portions of the first side outer periphery of the electrode assembly receiving portion and have first and second respective ones of the at least one protective film attached thereto.

3. The method according to claim 1, wherein
    each corner portion is a portion at which a bottom surface of the electrode assembly receiving portion and two adjacent side surfaces of the electrode assembly receiving portion are joined to each other, and
    first, second, third, and fourth ones of the at least one corner portion of the bottom surface of the electrode assembly receiving portion have first, second, third, and fourth respective ones of the at least one protective film attached thereto.

4. The method according to claim 1, wherein each protective film extends to a sealing prearrangement portion of the first side outer periphery of the preliminary battery case.

5. The method according to claim 1, wherein each protective film has a size and a shape corresponding respectively to a size and a shape of the corresponding one of the at least one corner portion of the electrode assembly receiving portion.

6. The method according to claim 4, wherein each protective film has a size and a shape corresponding respectively to sizes and shapes of the corresponding one of the at least one corner portion of the electrode assembly receiving portion and the sealing prearrangement portion.

7. The method according to claim 1, wherein the film layer of each protective film comprises nylon or a PET-based compound.

8. The method according to claim 7, wherein the adhesive layer of each protective film is attached to the outer surface of the corresponding one of the at least one corner portion of the electrode assembly receiving portion, each protective film maintaining the shape of the corresponding one of the at least one corner portion during step (c) and step (d).

9. The method according to claim 1, wherein the at least one protective film is a single protective film attached along the first side outer periphery of the preliminary battery case, the first side outer periphery comprising first and second opposite end ones of the at least one corner portion.

10. The method according to claim 1, further comprising a process of temporarily sealing the first side outer periphery of the preliminary battery case before the activation process of step (c) is performed.

11. The method according to claim 1, further comprising removing an end of the first side outer periphery of the preliminary battery case and folding the first side outer periphery and a third side outer periphery of the outer peripheries of the preliminary battery case between step (d) and step (e).

12. The pouch-shaped battery cell manufactured using the method according to claim 1.

13. A battery module comprising the pouch-shaped battery cell according to claim 12.

* * * * *